United States Patent [19]

Elka et al.

[11] Patent Number: 4,708,537

[45] Date of Patent: Nov. 24, 1987

[54] METAL CUTTING TOOL

[75] Inventors: Shmuel Elka, Nahariya; Amir Satran, Kiryat Bialik, both of Israel

[73] Assignee: Iscar Ltd., Nahariya, Israel

[21] Appl. No.: 897,548

[22] Filed: Aug. 15, 1986

[30] Foreign Application Priority Data

Aug. 28, 1985 [IL] Israel ........................................ 76241

[51] Int. Cl.⁴ ................................................ B23C 5/22
[52] U.S. Cl. ........................................ 407/46; 407/48; 407/59; 408/713
[58] Field of Search ........................ 407/34, 35, 36, 40, 407/46, 47, 48, 101, 103, 53, 59; 408/713; 144/218, 219, 240, 241

[56] References Cited

U.S. PATENT DOCUMENTS 2,865,572  12/1958  Lannert ................................. 407/48
3,371,397   3/1968  Coleshill et al. ....................... 407/36

FOREIGN PATENT DOCUMENTS 2343542  11/1977  France .................................... 407/46
2018652  10/1979  United Kingdom ................... 407/46

Primary Examiner—Nicholas P. Godici
Assistant Examiner—Jerry Kearns
Attorney, Agent, or Firm—Burgess, Ryan & Wayne

[57] ABSTRACT

A metal cutting tool having an exchangeable cutting insert mounted on a replaceable cartridge seat releasably fitted in a tool holder of the cutting, the cartridge seat comprising a body portion with a receiving pocket formed therein, an axially directed external surface of the body portion and a substantially planar rear surface thereof; the receiving pocket being formed with a substantially planar insert receiving surface; the tool holder being formed with an insert receiving cavity having an axially directed internal surface adapted to receive the body portion and a substantially planar end surface adapted to abut said rear surface; one of said axially directed surfaces being substantially cylindrical and the other being formed with three suitably located, axially directed protrusions so that upon the screw coupling together of the cartridge seat in the receiving pocket the body portion pivots about its region of abutment so as to be clamped against the protrusions.

3 Claims, 3 Drawing Figures

METAL CUTTING TOOL

BACKGROUND OF THE INVENTION

This invention relates to a metal cutting tool such as a milling, a turning or a drilling tool having exchangeable cutting inserts. The invention is particularly concerned with such metal cutting tools wherein the exchangeable cutting insert is mounted on a replaceable cartridge seat which is, in its turn releasably fitted in a receiving pocket formed in a tool holder of the cutting tool.

The use of such replaceable cartridge seats is particularly indicated where it is desired to avoid or at least minimize damage to the tool holder itself as a consequence of wear or breakage of the exchangeable insert. Thus, where the insert is directly mounted on the tool holder, it will be readily appreciated that extensive wear of the insert or breakage thereof can result in damage to the tool holder which then has to be taken out of use for repair or replacement. Where however the insert is mounted on a replaceable cartridge seat, only the latter has to be replaced when necessary thereby minimizing the expense involved in replacing or repairing the tool holder as a whole.

With the use of such replaceable cartridge seats a problem arises of ensuring the substantially constant spatial disposition of the cutting insert within the tool holder of the cutting tool. Thus, seeing that the cutting insert is held in the cutting tool via the replaceable cartridge seat, variations in the dimensions of the replaceable cartridge seat and in its relative spatial location in the tool holder, are immediately translated into variations in the relative spatial disposition of the cutting insert and such variations give rise to undesirable aspects of the cutting process.

OBJECTS AND SUMMARY OF THE INVENTION

It is an object of the present invention to provide a metal cutting tool having an exchangeable cutting insert mounted on a replaceable cartridge seat releasably fitted in a receiving pocket formed in a tool holder of the tool wherein the above-referred to disadvantages are substantially avoided or reduced.

According to the present invention there is provided a metal cutting tool having an exchangeable cutting insert mounted on a replaceable cartridge seat releasably fitted in a tool holder of the cutting tool, the improvement wherein said cartridge seat comprises a body portion with a receiving pocket formed therein, an axially directed external surface of the body portion and a substantially planar rear surface thereof, said receiving pocket being formed with a substantially planar insert receiving surface; said tool holder being formed with an insert receiving cavity having an axially directed internal surface adapted to receive said body portion and a substantially planar end surface adapted to abut said rear surface; one of said axially directed surfaces being substantially cylindrical and the other being formed with a first, axially directed protrusion located in a plane of symmetry of said body portion substantially normal to the insert receiving surface and located on one side of said insert receiving surface and with two further, axially directed protrusions located symmetrically with respect to said plane of symmetry and located on an opposite side of said insert receiving surface; a screw coupling bore formed eccentrically in said body portion so as to be aligned with a corresponding screw coupling bore formed in the tool holder and opening out into said end surface, said rear and end surfaces defining between them an acute angle which extends from a region of abutment of said rear and end surfaces; the arrangement being such that upon the screw coupling together of said cartridge seat in said receiving pocket said body portion pivots about its region of abutment so as to be clamped by said protrusions.

With such a metal cutting tool in accordance with the invention, it can be shown that the ultimate location of the cutting edge of the exchangeable cutting insert is only minimally affected as a result of variations in the dimensions of the replaceable cartridge seat vis-a-vis its receiving pocket and in this way the replacement of the cartridge seat affects only minimally the cutting performance of the tool.

BRIEF DESCRIPTION OF THE DRAWINGS

For a better understanding of the present invention and to show how the same may be carried out in practice, reference will now be made to the accompanying drawings in which.

DESCRIPTION OF THE PREFERRED EMBODIMENTS

Figure 1:
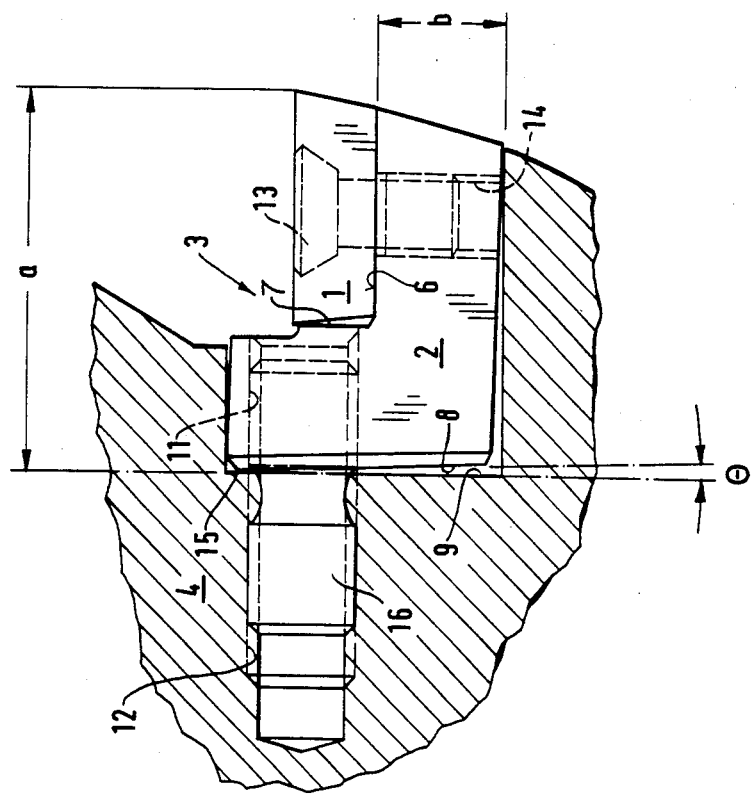
FIG. 1 is a cross-sectional view of the replaceable cartridge seat, exchangeable cutting insert and tool holder of FIG. 2, taken along line I—I thereof.
Figure 2:
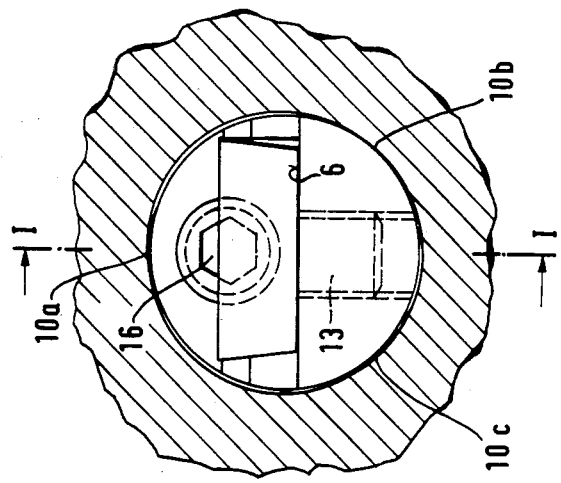
FIG. 2 is an end elevation of a replaceable cartridge seat on which is mounted an exchangeable cutting insert and which is releasably fitted in a receiving pocket formed in a tool holder of a cutting tool in accordance with the invention.

As seen in FIGS. 1 and 2 of the drawings an exchangeable cutting insert 1 is mounted on a replaceable cartridge seat 2 which is in its turn releasably fitted in a receiving cavity 3 formed in a tool holder 4.

The cartridge seat 2 comprises an essentially cylindrically shaped body portion having a receiving pocket formed therein, which pocket has a substantially planar insert receiving surface 6 and a normally directed insert abutting edge 7. The cartridge seat 2 is formed with a planar rear surface 8 whilst the cavity 3 is formed with a planar end surface 9. The cavity 3 is formed with an internal axial surface which, whilst being essentially cylindrical is provided with three axially directed protrusions 10a, 10b and 10c. The protrusion 10a is located in a plane of symmetry of the cartridge seat 2 substantially normal to the insert receiving surface 6. The two other axially directed protrusions 10b and 10c are located symmetrically with respect to this plane of symmetry and on a side of the insert receiving surface 6 opposite to the side on which the first mentioned axially directed protrusion 10a is located.

A screw coupling bore 11 is formed eccentrically in the cartridge seat so as to be aligned with a corresponding through-coupling bore 12 formed in the tool holder and opening out into the end surface 9.

The cutting insert 1 is mounted on the insert receiving surface 6 by means of a bolt 13 which extends through a central bore formed in the insert 1 into an aligned bore 14 formed in the base of the seat.

The rear surface 8 of the cartridge seat 2 is inclined with respect to a plane normal to a diametrical plane thereof so that when the cartridge seat is fully inserted into the cavity 3, the rear and end surfaces 8 and 9 abut at an abutting region 15 and define between them an angle $\theta$ which opens outwardly from the abutting region 15.

The cartridge seat 2 is secured to the tool holder 4 within cavity 3 by means of a coupling bolt 16 which extends through the aligned bores 11 and 12.

With the tightening of the coupling bolt 16 in the aligned bores 11 and 12, a turning moment is imparted to the cartridge seat 2 so as to cause it to pivot about its abutment region 15 and so that its outer cylindrical surface is firmly clamped against the axially directed protrusions 10a, 10b and 10c.

It will be readily seen that by virtue of the construction described above the cartridge seat is always firmly clamped to the tool holder along four regions of contact, three being along the axially directed protrusions 10a, 10b and 10c and the fourth being in the abutment region 15.

It will be realized that one of the desiderata of an exchangeable cutting insert mounting system is that, with each exchange, the spatial disposition of the cutting edge of the insert varies only minimally. This is of particular importance where the insert is used in a rotary cutting tool seeing that the spatial disposition of the cutting edge determines the cutting radius and each variation in this spatial disposition introduces a corresponding variation in the cutting radius.

Quite clearly where, as in the case of the cutting tool in accordance with the present invention, the cutting insert is mounted in the cutting tool via a replaceable cartridge seat, variations in the dimensions of the cartridge seat must inevitably introduce variations in the spatial disposition of the cutting edge. In this connection the critical dimensions of the cartridge seat 2 as described above insofar as they affect the spatial disposition of the cutting edge of the cutting insert, are the distance a between the cutting edge and the abutment region 15 and the height b between the insert receiving surface 6 and the lowermost point on the seat 2. On the other hand, it can be shown that relatively wide variations in the diameter of the cartridge seat vis-a-vis the diameter of the cavity only introduces minimal variations into the spatial disposition of the cutting edge of the insert. Thus despite such variations which inevitably arise with the replacement of the cartridge seat and, assuming that variations in the length a and height b are kept to a minimum, the replacement of the cartridge seat does not introduce substantial undesirable variations in the spatial disposition of the cutting edge of the insert.

Furthermore, by virtue of the fact that the cartridge seat is bolted to the tool holder by means of an eccentrically located bolt, rotation of the cartridge seat within the cavity during the bolting operation is prevented.

Whilst in the arrangement specifically described above the cartridge seat has an external cylindrical surface whilst the cavity is provided with the axially directed protrusions, this arrangement can be reversed and the cartridge seat can be provided with the axially directed protrusions whilst the cavity be formed with a fully cylindrical inner surface.

Alternatively, the cartridge seat can be formed with an external surface which tapers slightly, the angle of taper being around 3°.

Figure 3:
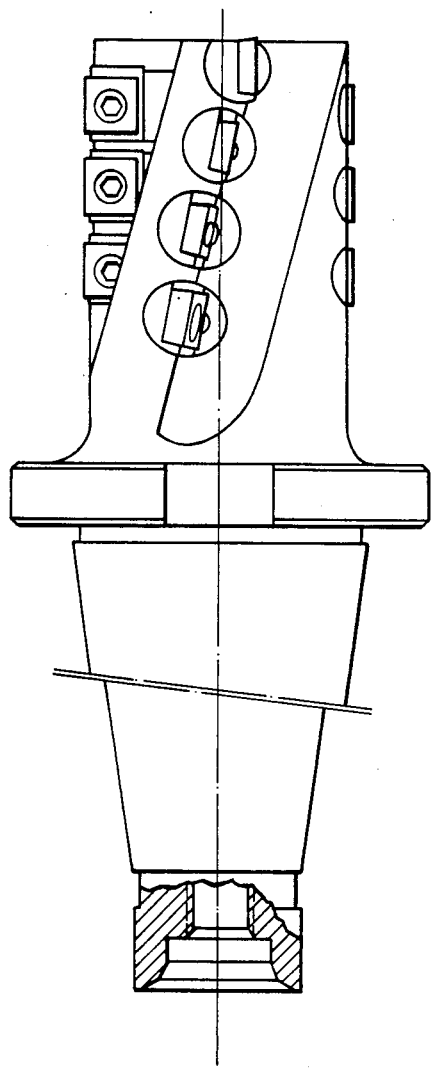
FIG. 3 is a side elevation of a multi-insert milling cutter tool incorporating the present invention.

As seen in FIG. 3 of the drawings, the arrangement for mounting the exchangeable cutting insert on a cutting tool via a replaceable cartridge seat in accordance with the present invention is shown applied to a multi-insert milling cutter. It will be readily realised that in such a tool the importance of ensuring a uniform cutting radius for all the cutting inserts is particularly acute and the present invention goes a long way to ensuring this requirement.

Quite clearly however, the invention is equally applicable to other types of rotary metal cutting operations such as turning or drilling using tools having exchangeable cutting inserts mounted on replaceable cartridge seats, in all cases the relatively invariant spatial disposition of the cutting edges being of considerable importance.

We claim:

1. In a metal cutting tool having an exchangeable cutting insert mounted on a replaceable cartridge seat releasably fitted in a tool holder of the cutting tool, the improvement wherein said cartridge seat comprises a body portion with a receiving pocket formed therein, said body portion having an axially directed external surface and a substantially planar rear surface, said receiving pocket being formed with a substantially planar insert receiving surface; said tool holder being formed with an insert receiving cavity having an axially directed internal surface adapted to receive said body portion and a substantially planar end surface adapted to abut said rear surface; one of said axially directed surfaces being substantially cylindrical and the other being formed with a first, axially directed protrusion located in a plane of symmetry of said body portion substantially normal to the insert receiving surface and located on one side of said insert receiving surface and with two further, axially directed protrusions located symmetrically with respect to said plane of symmetry and located on opposite sides of said insert receiving surface; a screw coupling bore formed eccentrically in said body portion so as to be aligned with a corresponding screw coupling bore formed in the tool holder and opening out into said end surface, said rear and end surfaces defining between them an acute angle which extends from a region of abutment of said rear and end surface; the arrangement being such that upon the coupling together of said cartridge seat in said receiving pocket said body portion pivots about its region of abutment so as to be clamped by said protrusions.

2. The improvement according to claim 1 wherein the axially directed external surface of the body portion is substantially cylindrical and wherein said axially directed protrusions are formed on the axially directed internal surface of the receiving cavity.

3. The improvement according to claim 1 wherein the axially directed external surface of the body portion is formed with a slight conical taper.

* * * * *